Patented Apr. 28, 1925.

1,535,375

UNITED STATES PATENT OFFICE.

HENRY L. PRESTHOLDT, OF MINNEAPOLIS, MINNESOTA.

CASEIN GLUE.

No Drawing.   Application filed April 17, 1922.   Serial No. 554,198.

*To all whom it may concern:*

Be it known that I, HENRY L. PRESTHOLDT, a citizen of the United States, residing at Minneapolis, in the county of Hennepin and State of Minnesota, have invented certain new and useful Improvements in Casein Glue; and I do hereby declare the following to be a full, clear, and exact description of the invention such as will enable others skilled in the art to which it appertains to make and use the same.

My invention provides a new composition of matter, herein designated as "casein glue", but which, from its broader aspect, is an adhesive composition adapted to be used, by itself or commingled with other substances, as an adhesive coating.

In this improved composition, casein is used as the adhesive base and is commingled with sodium formate, calcium hydroxide, sodium sulphite and alum.

I have obtained a highly efficient glue or adhesive by the use of the above noted substances in accordance with the following formula:

| | |
|---|---|
| Casein | 50 to 75 parts. |
| Sodium formate | 1 to 6 parts. |
| Calcium hydroxide | 10 to 30 parts. |
| Sodium sulphite | 3 to 10 parts. |
| Alum | 2 to 6 parts. |

The above noted substances are commingled in dry powdered form and are sold in that condition. When the adhesive composition is to be used, it will be introduced into water to form emulsion, and it is then, of course, that the chemical reactions that develop the adhesive qualities of the composition, will take place. After these reactions have taken place, the emulsion is adapted to be used as a glue or as a coating or to be commingled with other substances, such as paint or calcimine, which contain color pigments. When desired, however, the color-producing pigments may be commingled with the dry composition. When the composition is to be used as a glue, no additions to the formula given, except water, will be required.

Sodium formate is a salt of formic acid, and when casein is precipitated with a formic acid or a formate, it will remain in solution for an indefinite period without deterioration. Alum acts as an agent, which increases the viscosity of the glue itself.

This glue has been found especially good for sticking leather onto wood and as a means of sticking together the very thinnest forms of veneers, in which latter application, it gives, because of its viscosity, very considerable additional tensile and bending strength to the veneer.

Calcium hydroxide, in combination with sodium sulphite and alum, acts as a solvent for casein. In an aqueous solution, colloids are formed, which, together with a calcium caseinate, produces a highly water-resistant adhesive. Sodium sulphite imparts a great penetrating value to the adhesive and, in a small way, loosens the grain of the wood, forming sulphite of cellulose, making a perfect joint. Alum prevents the glue mixture from becoming too viscous and prolongs its liquid life. Sodium formate, due to its antiseptic properties, retards the formation of nitrogen.

Sodium sulphite is essential to the production of glue having the important properties herein specified, but the alum, while important, is not essential and may be omitted, especially in glues that are not necessarily kept long in liquid form.

What I claim is:—

1. An adhesive composition comprising the following ingredients in substantially the following proportions:

| | |
|---|---|
| Casein | 50 to 75 parts. |
| A salt of formic acid | 1 to 6 parts. |
| Calcium hydroxide | 10 to 30 parts. |
| Sodium sulphite | 3 to 10 parts. |

2. An adhesive composition made in accordance with the following formula:

| | |
|---|---|
| Casein | 50 to 75 parts. |
| Sodium formate | 1 to 6 parts. |
| Calcium hydroxide | 10 to 30 parts. |
| Sodium sulphite | 3 to 10 parts. |
| Alum | 2 to 6 parts. |

In testimony whereof I affix my signature.

HENRY L. PRESTHOLDT.